United States Patent [19]

Naitoh et al.

[11] Patent Number: 5,263,113
[45] Date of Patent: Nov. 16, 1993

[54] METHOD AND APPARATUS FOR CONTROLLING THE SPEED OF A MOTOR

[75] Inventors: Haruo Naitoh, Chofu, Japan; David H. E. Butler, New South Wales, Australia

[73] Assignees: Kabushiki Kaisha Toshiba, Kawasaki; The Broken Hill Proprietary Company Limited, Melbourne, Australia

[21] Appl. No.: 769,842

[22] Filed: Oct. 2, 1991

[30] Foreign Application Priority Data

Oct. 2, 1990 [JP] Japan .................................. 2-264111

[51] Int. Cl.⁵ ............................................. H02P 5/168
[52] U.S. Cl. .................................... 388/815; 388/930; 318/432; 318/646
[58] Field of Search ............... 318/646, 560, 561, 563, 318/569, 609-610, 650, 689, 432; 388/800, 806, 815, 821-823, 902, 930

[56] References Cited

U.S. PATENT DOCUMENTS

| | | | |
|---|---|---|---|
| 3,756,335 | 9/1973 | Eisele et al. | 318/52 X |
| 4,535,405 | 8/1985 | Hill et al. | 318/490 X |
| 4,756,375 | 7/1988 | Ishilcure et al. | 318/489 X |
| 4,914,726 | 4/1990 | Burke | 318/646 |

FOREIGN PATENT DOCUMENTS 2337722  2/1975  Fed. Rep. of Germany .

*Primary Examiner*—William M. Shoop, Jr.
*Assistant Examiner*—David Martin
*Attorney, Agent, or Firm*—Oblon, Spivak, McClelland, Maier & Neustadt

[57] ABSTRACT

An apparatus is disclosed which controls the speed of a motor driving a load. A speed controller finds the difference between a command speed value of the motor and a detected speed value of the motor and generates a command current value of the motor on the basis of the difference. A current controller controls current in the motor on the basis of a difference between a command current value received from the speed controller and a detected current value. A torque detector is mounted on the shaft, whereby the motor is connected to the load, for detecting torque acting on the shaft, and an adder adds the detected torque signal detected by the torque detector to the command current value received from the speed controller, the torque detection signal being a correction signal for controlling acceleration torque of the motor.

4 Claims, 4 Drawing Sheets

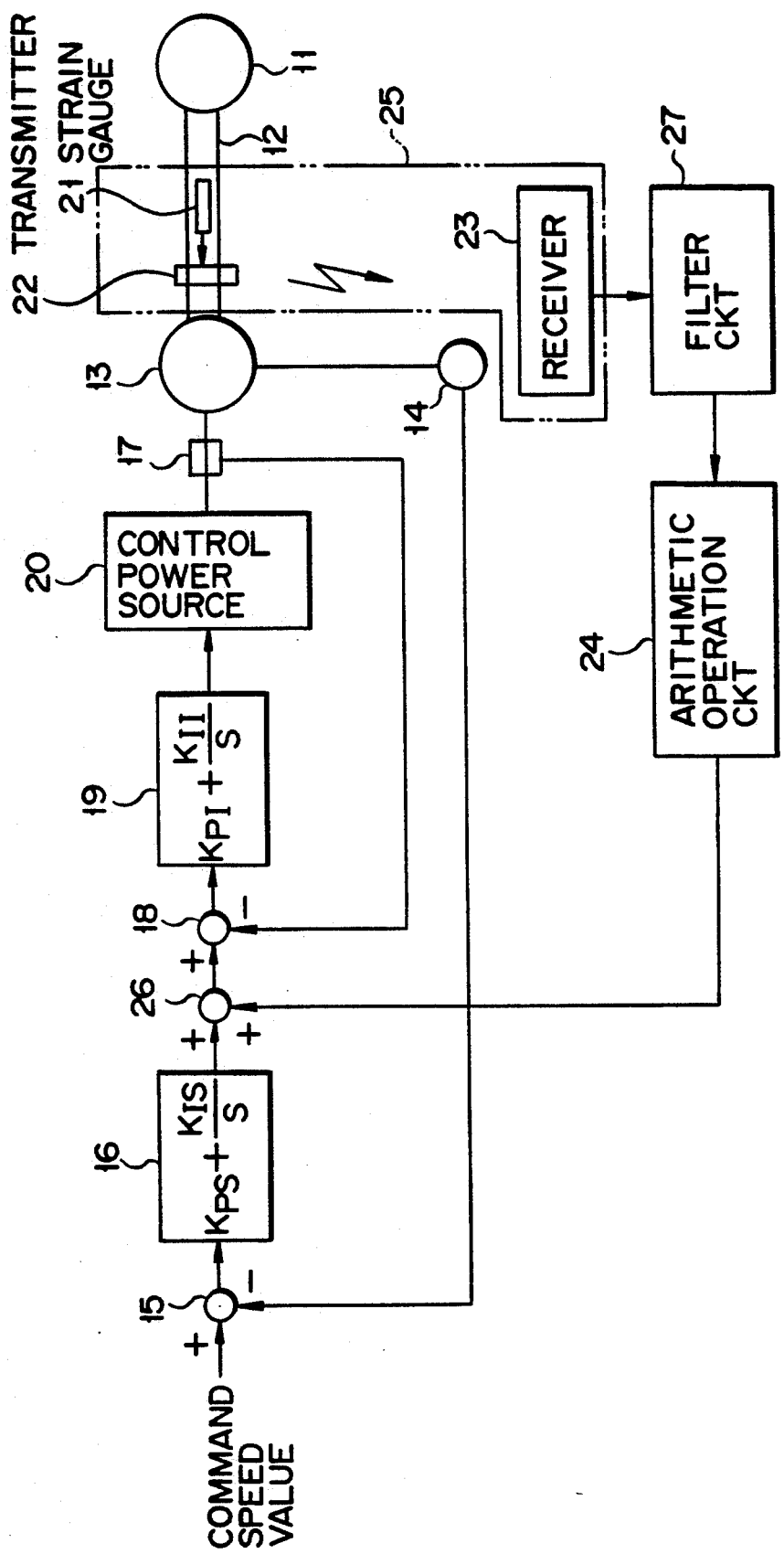
F I G. 2

METHOD AND APPARATUS FOR CONTROLLING THE SPEED OF A MOTOR

BACKGROUND OF THE INVENTION

1. Field of the Invention

The present invention relates to an apparatus for controlling the speed of a motor which can prevent or suppress oscillation caused by torsion acting on a shaft between a load and the motor for driving the load and to a method for controlling the speed of a motor.

2. Description of the Related Art

An apparatus for controlling the speed of a motor for driving, as a load, a rolling machine for rolling for example steel, uses a speed control system as shown in FIG. 3.

As shown in FIG. 3, the speed control system comprises a speed control loop and a current control minor loop. The speed control loop comprises a speed detector 4 for detecting the rotational speed of a DC motor 3 to which a load 1 is coupled through a shaft 2, a first subtracter 5 for finding a difference between a command speed value and a detection speed value detected by the speed detector 4, and a speed controller 6, responsive to the speed difference from the first subtracter, for delivering a command current value based on a given control theory. The current control minor loop comprises a current detector 7 for detecting current in the motor 3, a second subtracter 8 for finding a difference between the command current value supplied from the speed controller 6 and a detection current value detected by the current detector 7, and a current controller 9, responsive to the current difference supplied from the second subtracter 8, for delivering a command voltage value to a control power source 10 on the basis of a given control theory. The speed control unit 6 and current control unit 9 are generally comprised of a proportional-plus-integral circuit.

In the case where the load 1 and motor of a control target are controlled in the speed control apparatus, a speed control system poses no problem if the shaft 2 coupling the motor to the load is sufficiently rigid. If, on the other hand, the shaft 2 exhibits sufficient elasticity, the oscillation caused by the torsion acting on the shaft is observed in the motor speed and load speed, for a reason as will be set out below, markedly lowering the speed controllability.

In the above motor speed control apparatus, the current control system incorporated as the minor loop is adapted to control current in an armature, that is, torque current proportional to the generation torque of the motor. It is therefore impossible to control acceleration torque directly related to the motor speed even if the torque acting on the shaft can be controlled.

As an example, Published Examined Japanese Patent Application 63-1839 discloses a motor speed control apparatus for suppressing oscillation caused by torsion acting on a shaft by which a motor is connected to a load.

FIG. 4 is a block diagram showing a motor speed control apparatus. The same reference numerals are employed in FIG. 4 to designate the same parts or elements corresponding to those shown in FIG. 3. The different parts or elements only will be explained below in more detail. As a system for controlling generation torque directly related to the motor speed, a shaft torque observer 30 is arranged in a feedback system relative to a current control system which receives the detection speed value and detection current value from the speed detector 4 and current detector 7. The shaft torque observer 30 implements an arithmetic operation based on the received detection speed value and detection current value to obtain an estimated shaft torque value and feeds the estimated value back to a second subtracter 8 in the current control system. In this case, a simulated value of the shaft torque is evaluated, by the arithmetic operation, from the detection speed value and detection current value as well as a mathematical model uniquely determined on the object to be controlled.

The motor speed control apparatus including the shaft torque observer 30 can be expected to suppress oscillation in the motor's shaft to some extent.

However, the shaft torque observer 30 sometimes fails to obtain a correct value of estimation because it involves a problem, such as an error of estimation or a rate of convergence to a true value. That is, the shaft torque observer 30 estimates the shaft torque through the mathematical operation based on a given theory, but, unlike the theory, some physical phenomenon, such as noise, emerges under the actual application circumstances. As such a phenomenon is not fully considered in the mathematical model, sometimes an estimated value of shaft torque entirely deviates from an observed value involved. In such a state, the speed control performance is degraded due to the presence of the shaft torque observer 30.

According to the "observer" theory, the shaft torque observer 30 requires a mathematical model for a to-be-controlled object for which observation is made, but it is not necessarily easy to obtain a correct mathematical model for the motor/load system. It is clear that the shaft torque, if being estimated based on an incorrect model, will deviate from the actual shaft torque.

Further, if the parameters of the object to be controlled, such as mechanical inertia and viscosity resistance, vary during the operation of the motor, even when the mathematical model is correct at one point of time or one point of operation, correct estimation cannot be expected throughout the whole operation period or over the whole operation range. If the mechanical inertia is involved for a system connecting rolls (rolls for a rolling machine) to a motor, for example, in a driving system for rolling steel or the like, it will prove insufficient for a reason set out below even if being incorporated into the mathematical model. During the rolling of steel, the mass of a steel sheet varies from the entering of it between the rolls until it leaves the rolled site. It is necessary at this time, to consider the mass involved. It is known that when coiling steel sheet by a coiling machine, the mass of the coiled sheet is gradually increased with an advance of the coiling operation and, hence, the mass of the load varies greatly between the time at which the coiling operation starts and its completion. It is not possible to precisely estimate shaft torque even if the mechanical inertia is unequivocally incorporated into the mathematical model.

Similarly, the parameters of the object to be observed are required to construct the mathematical model, but the parameters of the load vary each time one object to be observed is switched to another object to be observed, requiring a cumbersome task of adjusting the mathematical model each time.

In the conventional motor speed control apparatus, the shaft torque observer receives the detection speed value and detection current value from the motor speed and current detectors and estimates the shaft torque through the arithmetic operation based on the mathematical model and feeds a value of estimation back to the current control system to suppress oscillation caused by the torsion acting on the shaft by which the motor is coupled to the load. The shaft torque observer estimates the shaft torque from the measured speed and current in the motor. These variables are produced only after the torque changes in the shaft have produced speed changes in the motor. Therefore the observer estimates of torque is delayed in time from the actual torque. It is, therefore, not possible to obtain a correct value of estimation. The mathematical model, in particular, is unequivocally determined, depending upon the object to be controlled. Since, in practice, a physical phenomenon different from the mathematical model may occur during the operation of the motor and load, the estimated value of shaft torque is sometimes entirely deviated from an observation value, posing a reliability problem.

SUMMARY OF THE INVENTION

It is accordingly an object of the present invention to provide a method and apparatus for controlling the speed of a motor, which can correctly control its shaft torque at all times, even if the parameters of a load vary due to the occurrence of various physical phenomena during the operation process of the motor and load, and thus reliably prevent or suppress oscillation caused by torsion changes acting upon the shaft.

According to one aspect of the present invention, there is provided a method for controlling the speed of an electric motor driving a load, comprising:

a speed control step of finding the difference between a command speed value of the motor and a detected speed value of the motor and generating a command current value of the motor on the basis of the difference;

a torque detection step for detecting a torque acting on a shaft connecting the motor to the load;

an adding step for adding a detected torque signal which is detected by the torque detection step to the command current value generated by the speed control step, the detection torque signal being added as a correction signal for controlling generation torque of the motor;

a current detection step for detecting a current in the motor; and a current control step for controlling current in the motor on the basis of the difference between the command current value to which the detected torque signal is added and the detected current value found by the current detection step.

According to another aspect of the present invention, there is provided an apparatus for controlling the speed of an electric motor driving a load, comprising:

a speed control means for finding a difference between a command speed value of the motor and a detected speed value of the motor and for generating a command current value of the motor on the basis of the difference;

a current control means for controlling current in the motor on the basis of the difference between the command current value received from the speed control means and a detected current value detected in the motor;

a torque detection means, mounted on a shaft connecting the motor to the load, for detecting torque acting on the shaft; and adding means for adding a detected torque signal detected by the torque detection means to the command current value obtained by the speed control means, the detected torque signal being a correction signal for controlling the generation torque of the motor.

In the present apparatus and method for controlling the speed of the motor, the command current signal to the current controller is corrected by the use of the torque signal measured by the torque detector based on the actual physical phenomenon and, as a result, the generation torque of the motor can be controlled as set out above. Further, it is possible to prevent or suppress oscillation caused by torsion acting on the shaft connecting the motor to the load.

Additional objects and advantages of the invention will be set forth in the description which follows, and in part will be obvious from the description, or may be learned by practice of the invention. The objects and advantages of the invention may be realized and obtained by means of the features and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a block diagram showing a motor speed control apparatus according to a second embodiment of the present invention.

DETAILED DESCRIPTION OF THE PREFERRED EMBODIMENTS

Figure 1:
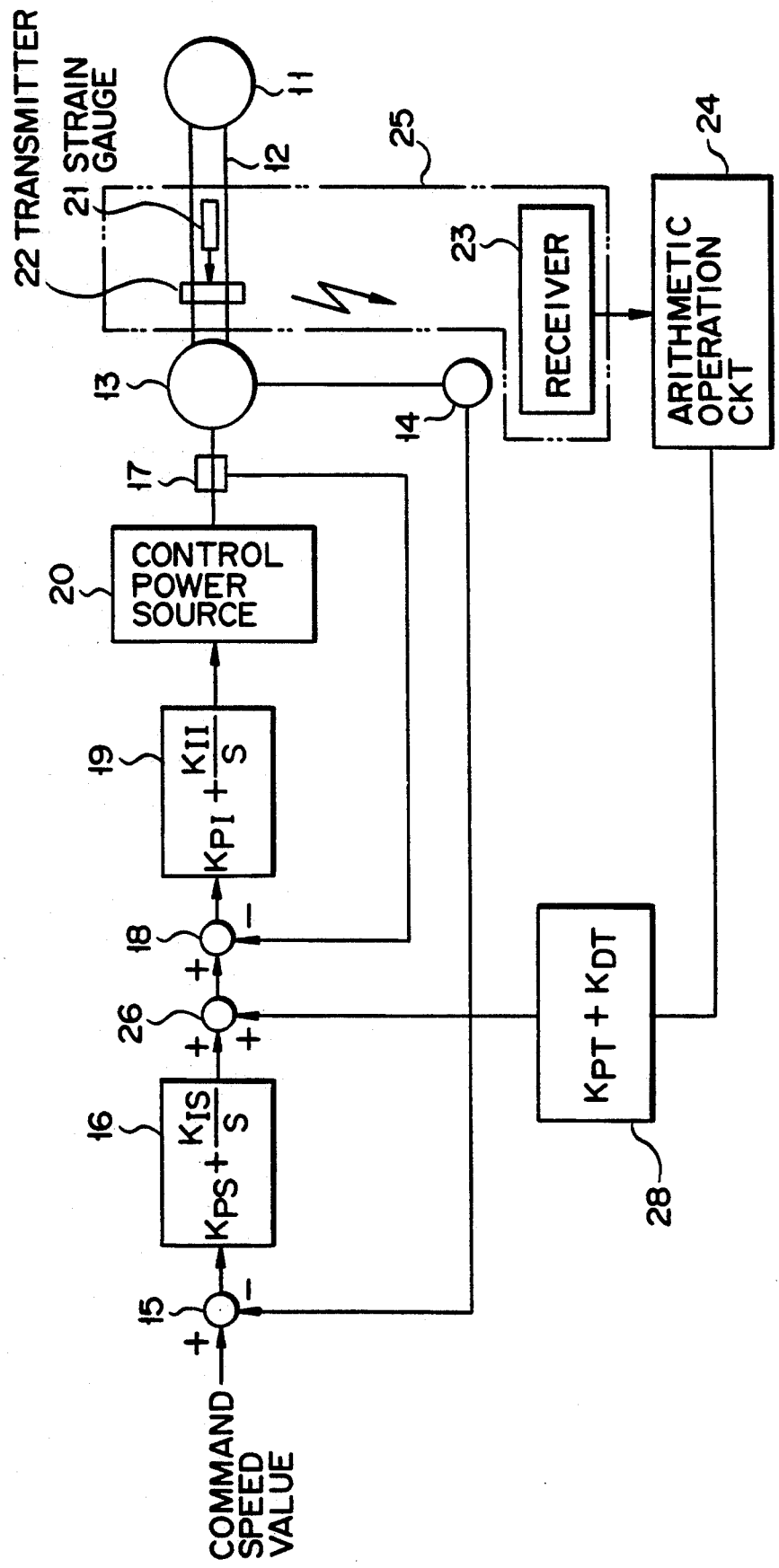
FIG. 1 is a block diagram showing a motor speed control apparatus according to a first embodiment of the present invention.
Figure 3:
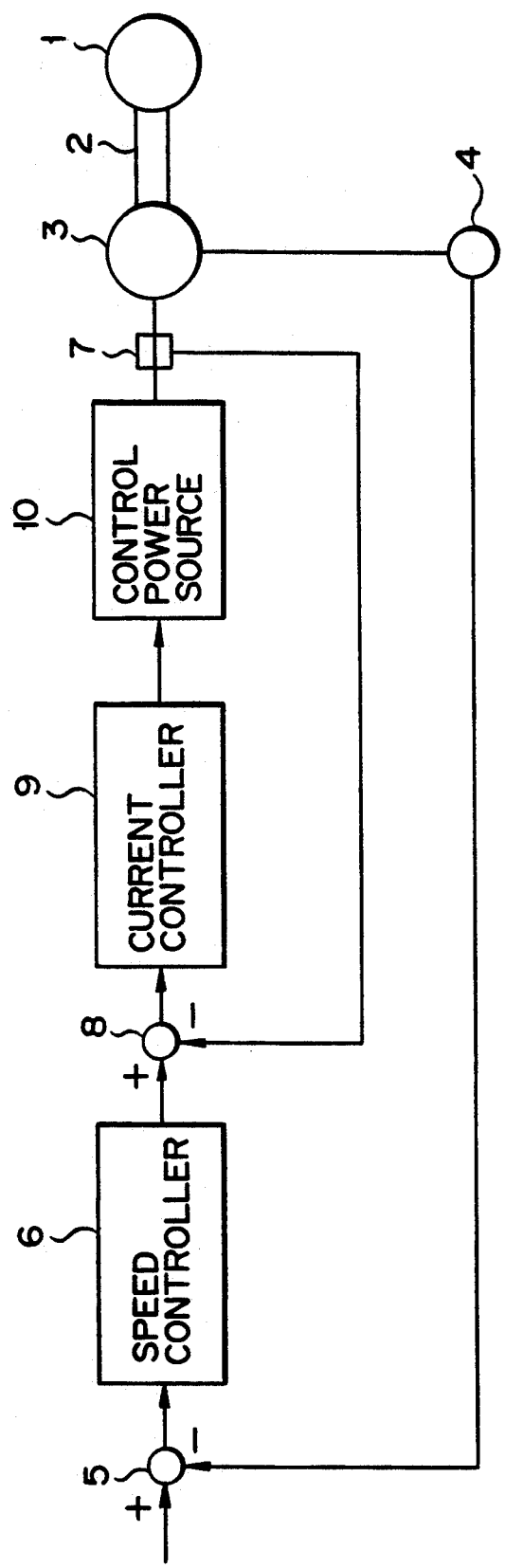
FIGS. 3 and 4, each, are a conventional form of different motor speed control apparatus.
Figure 4:
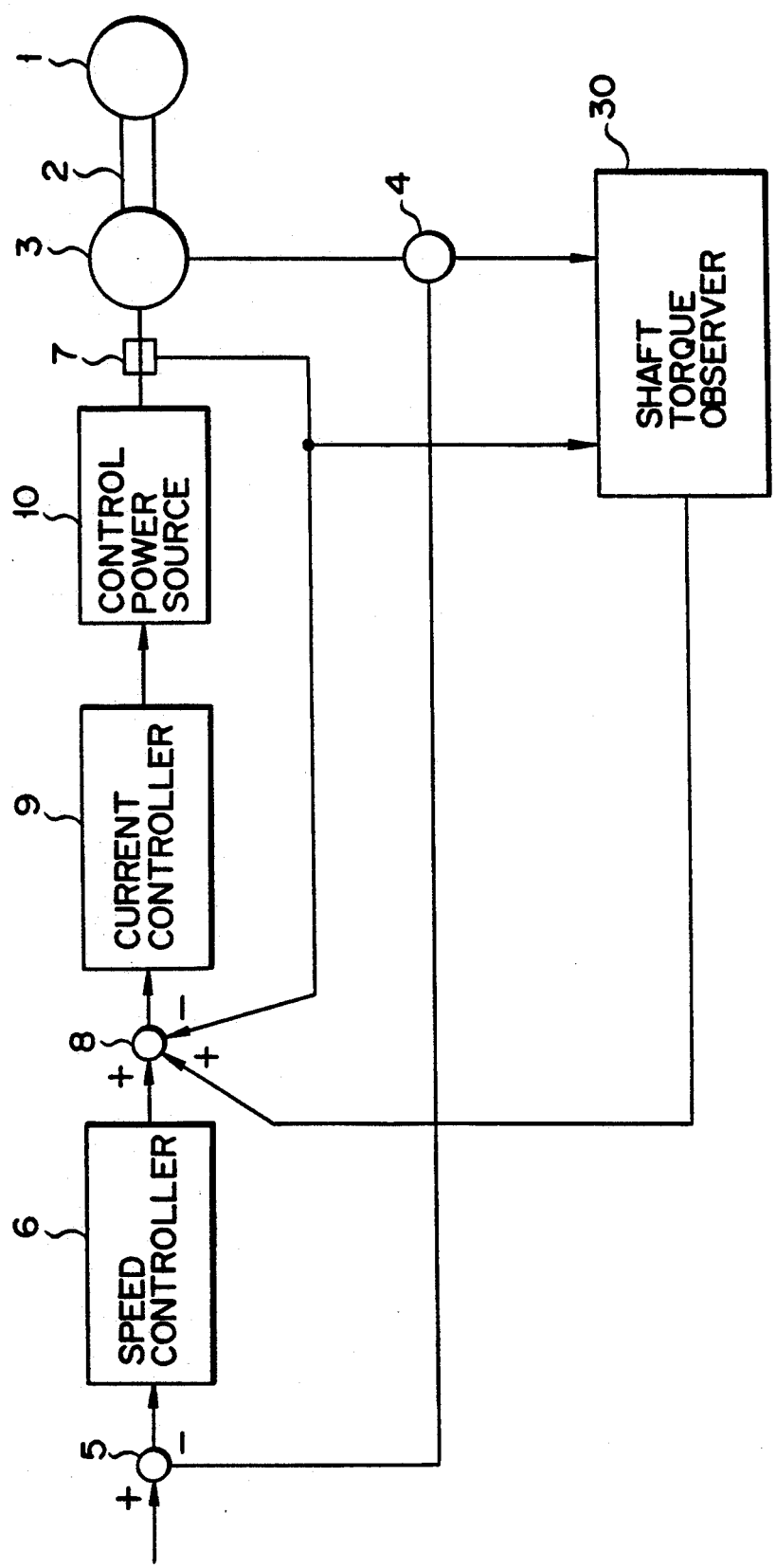

As shown in FIG. 1, a speed control system comprises a speed control loop and a current control minor loop. The speed control loop comprises a speed detector 14 for detecting the rotational speed of a DC motor 13 connected to a load 11 through a shaft 12, a first subtracter 15 for finding a difference between a command speed value and a detected speed value detected by the speed detector 14, and a speed controller 16 for receiving an indication of speed difference from the first subtracter 15 and delivering a command current value based on a given control theory. The current control minor loop comprises a current detector 17 for detecting current in the motor 13, a second subtracter 18 for finding a difference between the command current value supplied from the speed controller 16 and the detected current value detected by the current detector 17, and a current controller 19 for receiving the current difference from the second subtracter 18 and for delivering a command voltage value to a control power source 20 based on the given control theory.

Here the speed controller 16 comprises a proportional-plus-integral circuit composed of a proportional element $K_{PS}$ and integral element $K_{IS}/S$ while, on the other hand, the current controller 19 comprises a proportional-plus-integral circuit composed of a proportional element $K_{PI}$ and integral element $K_{II}/S$.

In such a speed control system, the present apparatus detects torque acting upon the shaft by the following arrangement.

A strain gauge 21 and transmitter 22 are mounted on the shaft 12 by which the motor 13 is connected to the load 11. The strain gauge 21 detects an amount of strain and supplies a detected signal as an electric signal. The transmitter 22 consists mainly of an FM transmitter for receiving the detected signal from the strain gauge 21 and transmitting it as a frequency-modulated (FM) radio signal. The strain gauge 21 and transmitter 22 are rotated integrally with the shaft. A receiver 23 provided on the non-rotating side receives the FM signal from the transmitter 22 and demodulates the FM wave as a detected signal corresponding to the amount of strain.

The strain gauge 21 and associated transmitter and receiver 22 and 23 constitute a torque detector 25. The receiver 23 in the torque detector 25 supplies a demodulated detected signal to an arithmetic operation circuit 24. The circuit 24 finds, from an amount of strain detected by the strain gauge 21, an amount of torque $T_S$ on the basis of a physical formula given by:

$$T_S = (\pi/32) D^3 G \epsilon \quad (1)$$

where
D: the diameter of the shaft;
G: the modulus of transverse elasticity; and
$\epsilon$: the amount of strain.
Then the arithmetic operation circuit converts it to an electric signal through the proportional element.

The electric signal produced by the arithmetic circuit 24 corresponding to the torque detected at the torque detector 25 has its response enhanced by a proportional-plus-differential circuit 28 composed of a proportional circuit $K_{PT}$ and a differential circuit $K_{DT}$, and feeds a result back to an adder 26 provided at an input stage of the current controller 19. The adder 26 adds the electric current corresponding to the shaft torque to a command current value as output from the speed controller 16, that is, corrects the command current value, and supplies an addition value to the first subtracter 18 in the current control minor loop.

An explanation will be given below of the function of the motor speed detection apparatus thus arranged.

Now consider the relationship $$T_G = T_{ACC} + T_S \quad (2)$$

where
$T_G$: the generation torque of the motor;
$T_{ACC}$: the acceleration torque of the motor; and
$T_S$: the torque acting upon the shaft.

Generally, the current control minor loop controls a torque current and, since the torque current is proportional to the generation torque, eventually controls the generation torque. The acceleration torque is related to the difference between the generated torque $T_G$ and the shaft torque $T_S$.

Hence the acceleration torque $T_{ACC}$ becomes:

$$T_{ACC} = T_G - T_S \quad (3)$$

In the case where a target object upon which the shaft torque acts is to be controlled, it is ideal to immediately control the generation torque $T_G$ to be equal to the shaft torque $T_S$. In this situation equation (3) becomes.

$$T_{ACC} = 0 \quad (4)$$

The differential part of the shaft torque feedback corresponding to the output from the differential circuit 28 represents the velocity of oscillation between the load and the motor. This then supplies a command current value that corrects the generation torque $T_G$ which will further prevent or suppress oscillation caused by torsion changes acting upon the shaft 12. By so doing, it is possible to correct a component corresponding to the shaft torque. In this case, the feedback signal supplied from the torque detector 25 becomes a command current correction signal of one kind.

In the present embodiment, the shaft torque signal measured by the torque detector based on the actual physical phenomenon is converted to the current signal. The current signal is fed back to the adder 26 at the input stage of the current controller 19 to enable it to be added to the command current value as output from the speed controller 16, and the result of addition is fed back to the current control minor loop to enable it to be corrected as a command correction current. By so doing, it is possible to control the acceleration torque of the motor and hence to prevent or suppress oscillation, caused by torsion acting upon the shaft 12, even when that torsion is generated in the shaft 12.

FIG. 2 shows a second embodiment of the present invention. The same reference numerals are employed in FIG. 2 to designate parts or elements corresponding to those shown in FIG. 1. Only different portions will be explained below.

In the second embodiment, a filter circuit 27 is provided between a torque detector 25 and an arithmetic operation circuit 24 as shown in FIG. 2 to eliminate noise from a torque signal detected by the torque detector 25. The noise-free signal is supplied from the filter circuit 27 to the arithmetic operation circuit 24.

In the arrangement of the second embodiment, the arithmetic operation circuit 24 performs an arithmetic operation on the noise-free detection torque signal and produces through that arithmetic proportional-plus-differential operation, an enhanced command current correction value.

Although the first and second embodiments have been explained as detecting the shaft torsion on the strain gauge 21 mounted as the torque detector 25 on the shaft 12, transmitting a detection signal from a transmitter 22 to a receiver 23 and then sending it to the arithmetic circuit 24, any other arrangement may be employed if torsion acting upon the shaft 12 can be detected on a "rotation" section and transmitted to a "non-rotation" side. For example, shaft torsion can be detected by directing a "light" signal at an axis of the shaft and detecting its deviation from a reference point where the light signal is received.

Although the arithmetic operation circuit 24 has been explained as being provided for finding the shaft torque from the detection signal corresponding to the shaft torsion, such an arithmetic operation may be made on the side of the transmitter mounted on the shaft 12, not on the side of the receiver.

Although the speed signal detected by the speed detector 14 has been explained as being fed back to the first subtracter 15 provided directly at the input stage of the speed controller 16, a compensation circuit may be provided in the feedback system to compensate for a response delay in the speed control of the feedback system.

Although the DC motor has been explained as being the motor in the first and second embodiments, a different type of motor can equally be employed, such as an AC induction motor or AC synchronous motor, to evaluate the control of electric current or torque. Various changes or modifications of the invention can be made without departing from the spirit and scope of the present invention.

According to the present invention, as set out above, the shaft torque signal measured by the torque detector on the basis of the actual physical phenomenon is fed, as a command current correction signal, back to the current control minor loop. It is, therefore, possible to accurately correct the shaft torque at all times, even if there occurs a variation in the load and in parameters resulting from various physical phenomena during the operation process of the motor and load, and hence to reliably prevent or suppress oscillation caused by torsion acting upon the shaft.

What is claimed is:

1. A method for controlling the speed of a motor comprising:
   a) determining a difference between a command speed value of the motor, said motor being controlled by a control power source and being adapted to drive a rolling mill, and a detected speed value;
   b) calculating a command current value based on said difference between the command speed value and the detected speed value;
   c) generating a signal corresponding to an amount of torsion of a shaft connecting the motor and the rolling mill;
   d) converting the generated signal to an electromagnetic output signal;
   e) transmitting the electromagnetic output signal obtained in said converting step from a location on said shaft;
   f) receiving the electromagnetic output signal transmitted in said transmitting step at a stationary location external to the motor;
   g) computing, on the basis of a physical formula, a detected shaft torque signal from the electromagnetic output signal received in said receiving step;
   h) adding the detected shaft torque signal computed in said computing step to the calculated command current value;
   i) correcting said calculated command current value in accordance with said detected shaft torque signal and the sum of an acceleration torque component and a shaft torque component;
   j) determining a difference between the corrected command current value and the detected current value of the motor;
   k) generating a command voltage value to be supplied to the control power source on the basis of the difference between the corrected command current value and the detected current value; and
   l) controlling an acceleration torque of the motor in accordance with said generated command voltage.

2. A speed control apparatus for controlling the speed of a motor, comprising:
   a motor controlled by a control power source for driving a rolling mill;
   speed control means for determining a difference between a command speed value of the motor and a detected speed value of the motor, and for generating a command current value of the motor on the basis of the difference between said command speed value and said detected speed value;
   a strain gauge mounted on a shaft connecting the motor to the rolling mill for generating a signal corresponding to an amount of torsion of the shaft for conversion into an electromagnetic output signal;
   transmitting means for transmitting the electromagnetic output signal from a location on the shaft;
   converting means for converting the said signal corresponding to an amount of torsion into said electromagnetic output signal;
   receiving means for receiving the electromagnetic output signal transmitted by the transmitting means provided at a stationary location external to the motor;
   computing means for computing, on the basis of a physical formula, a detected shaft torque signal from the signal received by the receiving means;
   adding means for adding the detected shaft torque signal computed by the computing means to the command current value for correcting said calculating command current value in accordance with said detected shaft torque signal and the sum of an acceleration torque component and a shaft torque component;
   current control means for determining a difference between the corrected command current value and the detected current value of the motor, for generating a command voltage value to be supplied to the control power source on the basis of the difference between said corrected command current value and said detected current value, and for controlling an acceleration torque of the motor in accordance with said generated command voltage value.

3. A speed control apparatus for controlling the speed of a motor, comprising:
   a motor controlled by a control power source for driving a rolling mill;
   speed control means for determining a difference between a command speed value of the motor and a detected speed value of the motor, and for generating a command current value of the motor on the basis of the difference between said command speed value and said detected speed value;
   a strain gauge mounted on a shaft connecting the motor to the rolling mill for generating a signal corresponding to an amount of torsion of the shaft for conversion into an electromagnetic output signal;
   converting means for converting the said signal corresponding to an amount of torsion into said electromagnetic output signal;
   transmitting means for transmitting the electromagnetic output signal from a location on said shaft;
   receiving means for receiving the electromagnetic output signal transmitted by the transmitting means at a stationary location external to the motor;
   filtering means for receiving an output signal from the receiving means and for eliminating noise components in the signal output from said receiving means, and for outputting a noise-eliminated signal;

computing means for computing, on the basis of a physical formula, a detected shaft torque signal from the noise-eliminated signal output from the filtering means;

adding means for adding the detected shaft torque signal computed by the computing means to the command current value generated by the speed control means and for correcting said calculated command current value in accordance with said detected shaft torque signal and the sum of an acceleration torque component and a shaft torque component; and current control means for determining a difference between the corrected command current value and the detected current value of the motor, for generating a command voltage value to be supplied to the control power source on the basis of said difference between the corrected command current value and the detected current value, and for controlling an acceleration torque of the motor in accordance with said generated command voltage value.

4. A speed control apparatus for controlling the speed of a motor, comprising:

a control power source;

a motor controlled by the control power source for driving a rolling mill;

a speed detector for detecting a speed value of the motor;

a current detector for detecting a current supplied to the motor;

a first subtractor for calculating a difference between a command speed value of the motor and the speed value of the motor detected by the speed detector;

a speed controller for outputting a command current value of the motor on the basis of the difference calculated by the first subtractor;

a strain gauge mounted on a shaft connecting the motor to the rolling mill for generating a signal corresponding to an amount of torsion of the shaft for conversion into an electromagnetic output signal;

a transmitter mounted on the shaft for frequency modulating the electromagnetic output signal obtained by the strain gauge, and for transmitting an FM-modulated signal;

a receiver mounted at a stationary location external to the motor for receiving the FM-modulated signal transmitted from the transmitter, demodulating said transmitted signal, and outputting said demodulated signal;

a filter circuit for receiving the signal output from the receiver, eliminating noise components in the received signal, and outputting a noise-eliminated signal;

a computing circuit for receiving the noise-eliminated signal from the filter circuit and determining a detected torque signal from the received signal on the basis of a physical formula;

an adder for adding the detected torque signal determined by the computing circuit to the command current value output by the speed controller and for correcting said calculated command current value in accordance with said detected shaft torque signal and the sum of an acceleration torque component and a shaft torque component;

a current controller for determining a difference between the corrected command current value and the current detected by the current detector, and delivering, as an output, the corrected command voltage value to be supplied to the control power source on the basis of said difference between the corrected command current value and the detected current value, thereby controlling an acceleration torque of the motor.

* * * * *